United States Patent
Thurston et al.

(10) Patent No.: US 9,792,247 B2
(45) Date of Patent: Oct. 17, 2017

(54) SYSTEMS AND METHODS FOR CHIP TO CHIP COMMUNICATION

(71) Applicant: QUALCOMM Incorporated, San Diego, CA (US)

(72) Inventors: Jason Alan Thurston, Raleigh, NC (US); Kenneth Luis Arcudia, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 242 days.

(21) Appl. No.: 14/801,310

(22) Filed: Jul. 16, 2015

(65) Prior Publication Data

US 2016/0019183 A1    Jan. 21, 2016

Related U.S. Application Data

(60) Provisional application No. 62/026,063, filed on Jul. 18, 2014.

(51) Int. Cl.
| | |
|---|---|
| *G06F 1/08* | (2006.01) |
| *G06F 13/42* | (2006.01) |
| *G06F 13/364* | (2006.01) |

(52) U.S. Cl.
CPC ............ *G06F 13/4291* (2013.01); *G06F 1/08* (2013.01); *G06F 13/364* (2013.01); *Y02B 60/1228* (2013.01); *Y02B 60/1235* (2013.01)

(58) Field of Classification Search
CPC ....................................................... G06F 1/08
See application file for complete search history.

(56) References Cited

U.S. PATENT DOCUMENTS

| | | | | |
|---|---|---|---|---|
| 5,991,279 | A | * | 11/1999 | Haugli ............... H04B 7/18513 340/7.34 |
| 6,914,954 | B2 | | 7/2005 | Lee et al. |
| 7,668,238 | B1 | * | 2/2010 | Rokhsaz ........... H04L 25/03146 333/18 |
| 8,204,167 | B2 | | 6/2012 | Sanders |
| 8,452,908 | B2 | | 5/2013 | Chengson et al. |

(Continued)

OTHER PUBLICATIONS

International Preliminary Report on Patentability for PCT/US2015/040887, dated Nov. 9, 2016, 14 pages.

(Continued)

*Primary Examiner* — Farley Abad
(74) *Attorney, Agent, or Firm* — Withrow & Terranova, PLLC

(57) ABSTRACT

Systems and methods for chip to chip communication are disclosed. In an exemplary aspect, a chip to chip link comprises a master device having a data transmitter, a clock, a clock transmitter, a phase locked loop (PLL) associated with the clock, and a receiver. The chip to chip link also comprises a slave device that has a data transmitter, a clock receiver, and a data receiver. Noticeably absent from the slave device is a clock or a PLL. By removing the clock from the slave device, the slave device does not have the power consuming element of a slave PLL. Further, because the slave device does not have a clock which would normally have to acquire a new frequency and settle, the master clock may change frequency relatively quickly and vary the frequency across many frequencies, not just one or two predefined frequencies.

19 Claims, 10 Drawing Sheets

(56) References Cited

U.S. PATENT DOCUMENTS

| | | | |
|---|---|---|---|
| 8,713,349 B2 | 4/2014 | Byeon et al. | |
| 2008/0080600 A1 | 4/2008 | Dai et al. | |
| 2010/0074388 A1* | 3/2010 | Coppin | G06F 13/4295 375/376 |
| 2011/0037505 A1* | 2/2011 | Kawamoto | H03L 7/07 327/159 |
| 2011/0241440 A1* | 10/2011 | Sakoda | H02J 5/005 307/104 |
| 2012/0007624 A1 | 1/2012 | Byeon et al. | |
| 2012/0049910 A1* | 3/2012 | Aoyama | H03L 7/089 327/156 |
| 2015/0098542 A1* | 4/2015 | Yi | H04L 7/0331 375/373 |

OTHER PUBLICATIONS

Notification Concerning Informal Communications with the Applicant for PCT/US2015/040887, dated Aug. 24, 2016, 3 pages.
International Search Report and Written Opinion for PCT/US2015/040887, dated Nov. 20, 2015, 9 pages.
Second Written Opinion for PCT/US2015/040887, dated Jun. 23, 2016, 4 pages.

* cited by examiner

SYSTEMS AND METHODS FOR CHIP TO CHIP COMMUNICATION

PRIORITY CLAIM

The present application claims priority to U.S. Provisional Patent Application Ser. No. 62/026,063 filed on Jul. 18, 2014 and entitled "SYSTEMS AND METHODS FOR CHIP TO CHIP COMMUNICATION," which is incorporated herein by reference in its entirety.

BACKGROUND

I. Field of the Disclosure

The technology of the disclosure relates generally to integrated circuits (ICs) and particularly to communication between two ICs.

II. Background

Computing devices are prevalent in contemporary society. Such computing devices benefit from an increasing array of functionality being made available by virtue of increasingly complex integrated circuits (ICs). Such ICs may be positioned on a printed circuit board (PCB) and interconnected through non-transitory conductive elements, for example, physical traces. Signals are routed onto these physical traces according to predefined protocols. The increased functionality increases the amount of data that is included in such signals, necessitating faster clock speeds and more conductive elements to accommodate the increased data.

In many instances, protocols used to package the data, such as Peripheral Component Interconnect (PCI), are created by a consortium of disparate commercial interests. The various entities involved in creating a protocol arrive at the final published protocol through a series of compromises and engineering realities. The benefit of having a common protocol is the readily available interoperability of devices made according to the protocol. Such interoperability gives device manufacturers flexibility in selecting vendors from whom components may be purchased. The downside of having a common protocol is that the protocol is frequently over-engineered to address "worst-case" scenarios. Such over-engineering results in excessive use of area within an IC and extra power consumption. An additional downside is that the protocol may not react quickly to changing realities. That is, new technologies or unexpected combinations of old technology may interact with the protocol poorly.

An example of such poor interaction is that as clock speeds on the chip to chip buses increase, increasingly more power is consumed. Further, as the clock speeds increase, the transition as the clock signal rises and falls is shortened (i.e., the transition occurs faster), which creates increasingly more electromagnetic interference (EMI) on other components within the computing device. Still further, such electromagnetic emissions may impact the ability of the computing device to qualify for desired treatment by the Federal Communications Commission's (FCC) emission standards. Thus, a way to improve signaling between chips is desired.

SUMMARY OF THE DISCLOSURE

Aspects disclosed in the detailed description include systems and methods for chip to chip communication. In an exemplary aspect, a chip to chip link comprises a master device having a data transmitter, a clock, a clock transmitter, a phase locked loop (PLL) associated with the clock, and a receiver. The chip to chip link also comprises a slave device that has a data transmitter, a clock receiver, and a data receiver. Noticeably absent from the slave device is a clock or a PLL. By removing the clock from the slave device, the slave device does not have the power consuming element of a slave PLL. Further, because the slave device does not have a clock which would normally have to acquire a new frequency and settle, the master clock may change frequency relatively quickly and vary the frequency across many frequencies, not just one or two predefined frequencies. Frequency shifting allows the chip to chip link to mitigate variable electromagnetic interference (EMI) aggression, as well as help prevent the chip to chip link from being a victim from variable EMI.

In this regard in one aspect, a master integrated circuit (IC) is provided. The master IC comprises a bus interface configured to be coupled to an interchip bus. The master IC also comprises a transmitter comprising a driver, the driver outputting a data signal to the bus interface for transmission across the interchip bus. The master IC also comprises a receiver coupled to the bus interface. The master IC also comprises a clock data recovery (CDR) circuit operatively coupled to the receiver. The master IC also comprises a PLL receiving a reference clock signal and outputting a clock signal to the driver of the transmitter and the CDR circuit. The transmitter outputs a master clock signal onto the interchip bus through the bus interface. The master IC also comprises a control system operatively coupled to the PLL and the CDR circuit. The control system is configured to change a frequency of the master clock signal by controlling the PLL. Data transmission continues during frequency change independent of clock activity at a remote slave IC.

In another aspect, a slave IC is provided. The slave IC comprises a bus interface configured to be coupled to an interchip bus. The slave IC also comprises a transmitter comprising a driver, the driver outputting a data signal to the bus interface for transmission across the interchip bus. The slave IC also comprises a receiver coupled to the bus interface. The receiver is configured to extract a clock signal from a signal received from a master IC through the interchip bus. The slave IC also comprises a clock data recovery (CDR) circuit operatively coupled to the receiver. The slave IC also comprises a control system operatively coupled to the receiver and the CDR circuit. The control system is configured to operate on the clock signal extracted by the receiver without reference to an internal phase locked loop (PLL) or internal clock.

In another aspect, a system is provided. The system comprises an interchip bus. The system also comprises a first IC. The first IC comprises a first bus interface configured to be coupled to the interchip bus. The first IC also comprises a first transmitter comprising a first driver, the first driver outputting a first data signal to the first bus interface for transmission across the interchip bus. The first IC also comprises a first receiver coupled to the first bus interface. The first IC also comprises a first CDR circuit operatively coupled to the first receiver. The first IC also comprises a first control system operatively coupled to the first CDR circuit. The system also comprises a second IC. The second IC comprises a second bus interface configured to be coupled to the interchip bus. The second IC also comprises a second transmitter. The second transmitter comprises a second driver, the second driver outputting a second data signal to the second bus interface for transmission across the interchip bus. The second IC also comprises a second receiver coupled to the second bus interface. The second receiver is configured to extract a clock signal from a signal received from the first IC through the interchip bus. The second IC also comprises a second CDR circuit operatively coupled to the second receiver. The second IC also comprises a second control system operatively coupled to the second receiver and the second CDR circuit. The second control system is configured to operate on the clock signal extracted by the second receiver without reference to an internal PLL or internal clock. The system also comprises a sole active PLL shared between the first IC and the second IC. The sole active PLL is configured to provide the clock signal for use by both the first IC and the second IC.

DETAILED DESCRIPTION

Figure 1:
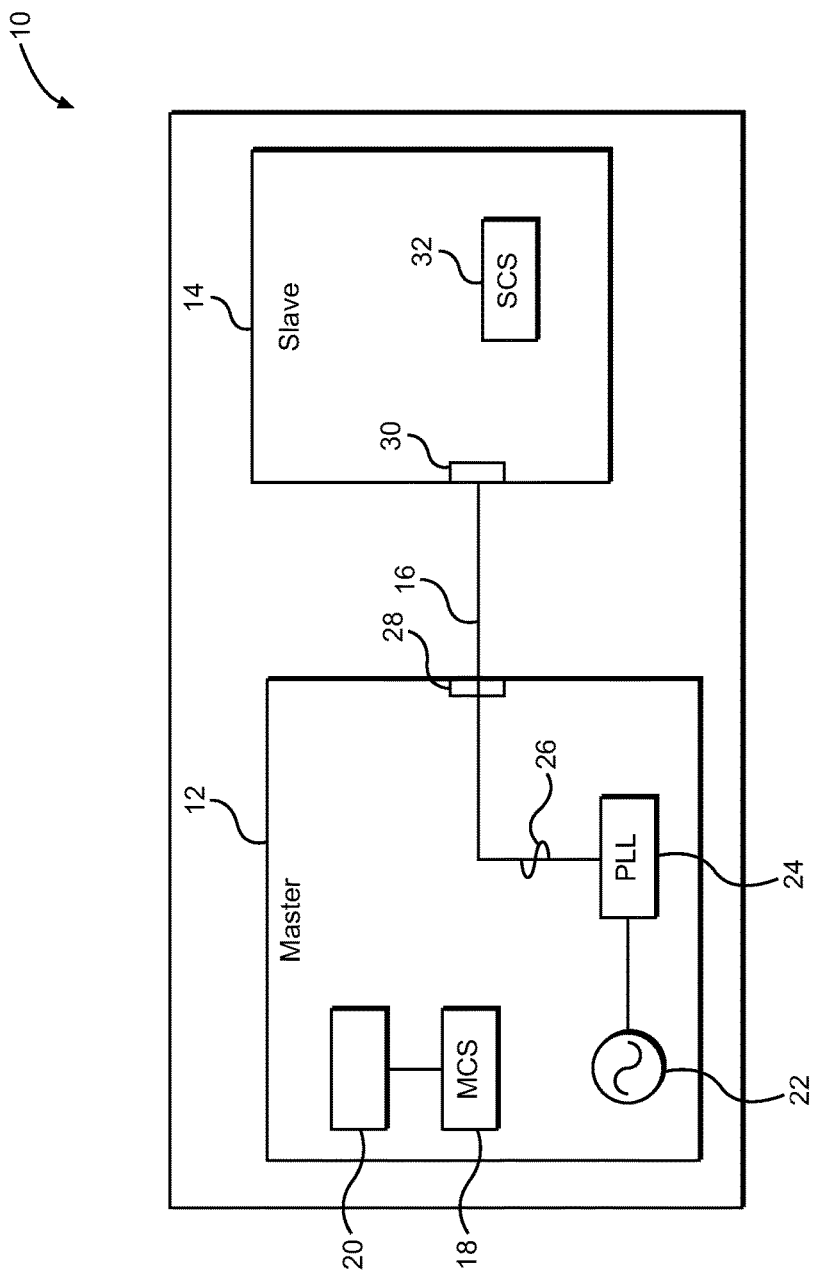
FIG. 1 is a simplified block diagram of a computing device with a master chip and slave chip according to an exemplary aspect of the present disclosure.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include systems and methods for chip to chip communication. In an exemplary aspect, a chip to chip link comprises a master device having a data transmitter, a clock, a clock transmitter, a phase locked loop (PLL) associated with the clock, and a receiver. The chip to chip link also comprises a slave device that has a data transmitter, a clock receiver, and a data receiver. Noticeably absent from the slave device is a clock or a PLL. By removing the clock from the slave device, the slave device does not have the power consuming element of a slave PLL. Further, because the slave device does not have a clock which would normally have to acquire a new frequency and settle, the master clock may change frequency relatively quickly and vary the frequency across many frequencies, not just one or two predefined frequencies. Frequency shifting allows the chip to chip link to mitigate variable electromagnetic interference (EMI) aggression, as well as help prevent the chip to chip link from being a victim from variable EMI.

In this regard, FIG. 1 is a block diagram of a computing device 10 that includes a master chip 12 that communicates with a slave chip 14 through an interchip bus 16. The computing device 10 may be a mobile terminal such as a smart phone or laptop computer or a more stationary computing device such as a desktop computer. The master chip 12 may include a master control system 18 (sometimes referred to as MCS) that works with local memory 20 and software to enable functions described herein. The master chip 12 may further include a master clock source 22 (sometimes referred to as an oscillator) and a PLL 24. While the master clock source 22 is illustrated as being within the master chip 12, in exemplary non-limiting aspects, the master clock source 22 may be positioned external to the master chip 12. The PLL 24 may be used to generate a clock signal 26 that is passed to the interchip bus 16 through a master bus interface 28. As is readily understood, the master bus interface 28 is configured to be coupled to the interchip bus 16.

With continued reference to FIG. 1, the slave chip 14 may include a slave bus interface 30 that is coupled to the interchip bus 16. The clock signal 26 passes over the interchip bus 16 to the slave chip 14. The slave chip 14 may include a slave control system 32 (sometimes referred to as SCS). The slave chip 14 extracts the clock signal 26 and uses the clock signal 26 as needed. As noted above, the slave chip 14 may omit a clock and/or PLL and rely on the clock signal 26 for any needed clocking within the slave chip 14. By omitting the clock and/or the PLL within the slave chip 14, substantial space and power savings may be achieved. Even if the slave chip 14 includes a slave clock and/or slave PLL, the slave clock and/or the slave PLL may be deactivated, which provides at least the power savings. Further, by relying on the clock signal 26, changes in the frequency of the clock signal 26 may be effectuated relatively quickly since there is no need to wait for the slave PLL to settle at a new frequency.

Figure 2:
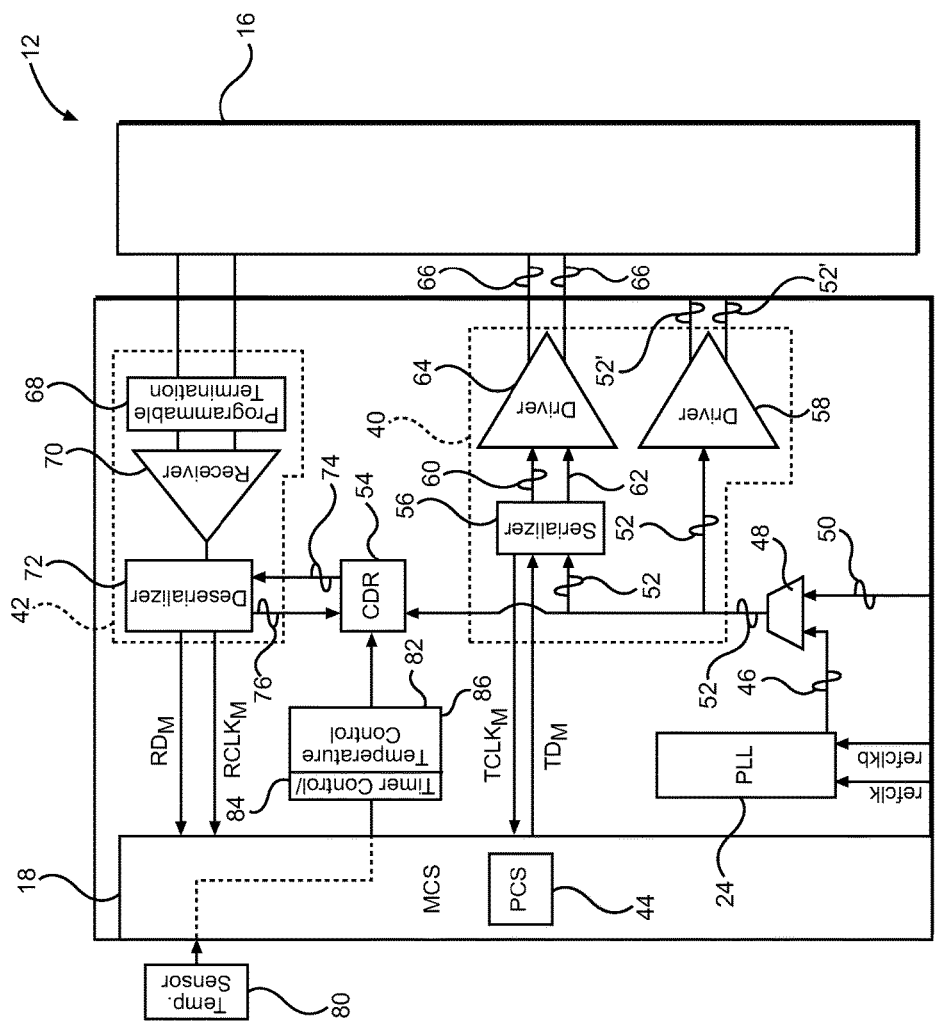
FIG. 2 illustrates a more detailed block diagram of the master chip of FIG. 1.
Figure 3:
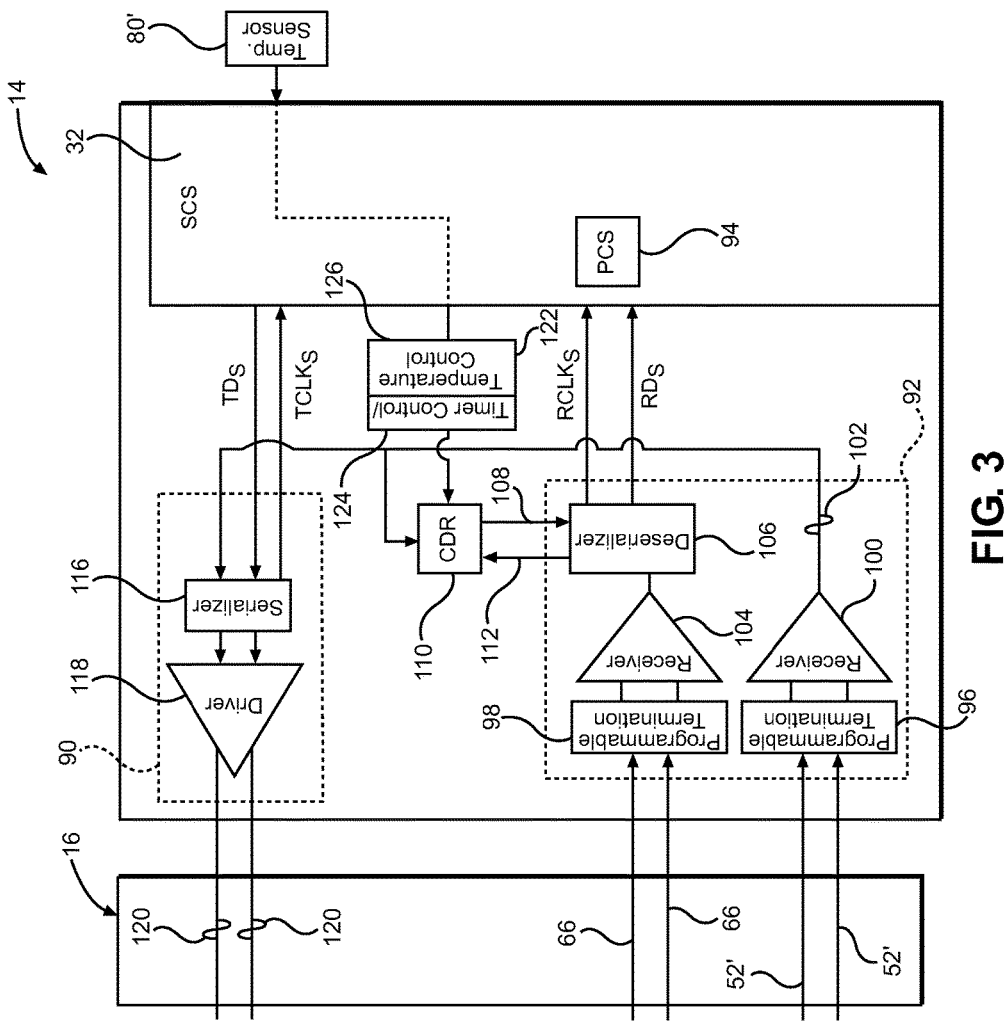
FIG. 3 illustrates a more detailed block diagram of the slave chip of FIG. 1.

Further details about the master chip 12 are provided in FIG. 2 while details about the slave chip 14 are provided in FIG. 3. In this regard, FIG. 2 illustrates a block diagram of the master chip 12 of FIG. 1. Common elements between FIGS. 1 and 2 are shown therein with common element numbers and will not be redescribed herein. The master chip 12 may include a master transmitter 40 and a master receiver 42. The MCS 18 may include a master physical coding sublayer (PCS) 44. The PCS 44 is the protocol-specific part of the physical layer, such as data encoding and decoding and byte and word alignment. The PLL 24 may receive a reference clock signal (refclk) and its complement signal (refclkb) and outputs a high speed clock signal 46 to a multiplexer 48. In an exemplary, non-limiting aspect, the PLL 24 has a zero (0) parts per million (ppm) frequency offset. Note that in an exemplary, non-limiting aspect, the PLL 24 may be a variable frequency PLL with a variety of different high speed frequencies available for the high speed clock signal 46. A control signal (not illustrated) from the MCS 18 causes the PLL 24 to adjust the frequency of the high speed clock signal 46. The multiplexer 48 also may receive a low speed clock signal 50. A control signal (not illustrated) from the MCS 18 causes the multiplexer 48 to select between the high speed clock signal 46 and the low speed clock signal 50 to output a selected clock signal 52. Note that when the low speed clock signal 50 is being used, the MCS 18 may turn off the PLL 24 to conserve power.

With continued reference to FIG. 2, the selected clock signal 52 is provided to the master transmitter 40, which also passes the selected clock signal 52 to a master clock data recovery (CDR) circuit 54. The master transmitter 40 provides the selected clock signal 52 to a master serializer 56 and a driver 58. The driver 58 may drive the selected clock signal 52 onto the interchip bus 16 as a differential-ended clock signal 52'.

With continued reference to FIG. 2, the master serializer 56 may receive data ($TD_M$) from the MCS 18 as well as provide a clock ($TCLK_M$) to the MCS 18. The master serializer 56 provides data signal 60 and clock signal 62 to a driver 64. The driver 64 may be an H-bridge driver or the like. The driver 64 drives the data onto the interchip bus 16 as a differential-ended data signal 66.

With continued reference to FIG. 2, the master receiver 42 may include a master programmable termination 68. The MCS 18 may send a control signal (not illustrated) to the master programmable termination 68 to adjust an impedance of the master programmable termination 68. Adjusting the master programmable termination 68 reduces reflections that may occur at a particular frequency as well as allows power savings to be effectuated. In particular, if the interchip bus 16 is relatively short, the impedance of the master programmable termination 68 may be increased which reduces the output driver power. In an exemplary non-limiting aspect, the master programmable termination 68 may vary between approximately fifty ohms (50Ω) and eight hundred ohms (800Ω), with various values in between as needed or desired. Each additional doubling of the impedance of the master programmable termination 68 halves the power required by a slave transmitter 90 (see FIG. 3). The master programmable termination 68 receives differential-ended signals from the slave chip through the interchip bus 16 and provides the received signals to receiver logic 70. The receiver logic 70 may pass the received signals to a master deserializer 72. The master deserializer 72 also receives a CDR clock signal 74 from the master CDR circuit 54. The CDR clock signal 74 is the clock signal recovered by the master CDR circuit 54. The master deserializer 72 provides an edge-sampled signal 76 to the master CDR circuit 54. The edge-sampled signal 76 is the edge sampled by the master deserializer 72 for use by the master CDR circuit 54 to detect the sign error of the data and clock alignment. The master deserializer 72 provides a received data signal ($RD_M$) and a received clock signal ($RCLK_M$) to the MCS 18. The master CDR circuit 54 allows data from the slave transmitter 90 to be aligned with the selected clock signal 52.

With continued reference to FIG. 2, the master chip 12 may be associated with a temperature sensor 80. In an exemplary not illustrated aspect, the temperature sensor 80 is part of the master chip 12. In another exemplary illustrated aspect, the temperature sensor 80 is proximate to, but separate from the master chip 12. Note that many chips include temperature sensors within the chip or die so as to measure the temperature of the die itself. The temperature sensor 80 provides a temperature signal to temperature control logic 82. Timer control logic 84 may be associated with the temperature control logic 82 and integrated into a single timer/temperature logic 86 or may be separate. The timer/temperature logic 86 may provide a signal to the master CDR circuit 54.

The slave chip 14 of FIG. 1 is similar and illustrated in greater detail in FIG. 3. Common elements between FIGS. 1 and 3 are shown therein with common element numbers and will not be redescribed herein. In this regard, the slave chip 14 may include the slave transmitter 90 and a slave receiver 92. The SCS 32 may include a slave PCS 94. Noticeably absent from the slave chip 14 is a PLL. The slave chip 14 relies on the differential-ended clock signal 52' received from the master chip 12.

With continued reference to FIG. 3, the slave receiver 92 may include a clock programmable termination 96 and a data programmable termination 98. Control signals (not illustrated) from the SCS 32 will vary the impedances of the programmable terminations 96 and 98 as needed to accommodate different frequencies generated by the master chip 12. The slave receiver 92 receives the differential-ended clock signal 52' at the clock programmable termination 96, which passes the differential-ended clock signal 52' to clock receiver logic 100. The clock receiver logic 100 outputs slave clock signal 102. The slave receiver 92 receives the differential-ended data signal 66 at the data programmable termination 98, which passes the differential-ended data signal 66 to data receiver logic 104. The data receiver logic 104 outputs the data to slave deserializer 106. The slave deserializer 106 provides a received data signal ($RD_S$) and a received clock signal ($RCLK_S$) to the SCS 32. The slave deserializer 106 further receives a CDR clock signal 112 from a slave CDR circuit 110. The CDR clock signal 112 is the clock signal recovered by the slave CDR circuit 110. The slave deserializer 106 provides an edge-sampled signal 114 to the slave CDR circuit 110. The edge-sampled signal 114 is the edge sampled by the slave deserializer 106 for use by the slave CDR circuit 110 to detect the sign error of the data and clock alignment. Much like the master programmable termination 68 of FIG. 2, the programmable terminations 96 and 98 may be varied to reduce power consumption.

With continued reference to FIG. 3, the slave CDR circuit 110 also receives the slave clock signal 102 from the slave receiver 92. The slave clock signal 102 is also provided to the slave transmitter 90. The slave transmitter 90 also receives slave transmitted data signal ($TD_S$) from the SCS 32 and provides slave transmitted clock signal ($TCLK_S$) to the SCS 32. The slave transmitter 90 includes a slave serializer 116 that serializes the $TD_S$ using the slave clock signal 102 and provides the serialized $TD_S$ to slave driver 118. The slave driver 118 puts a differential-ended data signal 120 onto the interchip bus 16 to the master chip 12.

With continued reference to FIG. 3, the slave chip 14 may be associated with a temperature sensor 80'. In an exemplary not illustrated aspect, the temperature sensor 80' is part of the slave chip 14. In another exemplary illustrated aspect, the temperature sensor 80' is proximate to, but separate from the slave chip 14. Note that many chips include temperature sensors within the die so as to measure the temperature of the die itself. The temperature sensor 80' may be the same as or separate and distinct from the temperature sensor 80 of FIG. 2. The temperature sensor 80' provides a temperature signal to temperature control logic 122. Timer control logic 124 may be associated with the temperature control logic 122 and integrated into a single timer/temperature logic 126 or may be separate. The timer/temperature logic 126 may provide a signal to slave CDR circuit 110.

As noted, the absence of a PLL on the slave chip 14 has numerous advantages including reduced power consumption and space savings. Further, having a single clock with programmable terminations allows for the frequency with which the data is sent between the chips 12 and 14 to be changed frequently. As noted, the programmable terminations 68, 96, and 98 may change impedance to optimize the termination impedance at new frequencies. Such changes in the frequency may be made to prevent communication between the master chip 12 and the slave chip 14 from acting as an EMI aggressor for other components in the computing device 10 of FIG. 1. For example, if the master chip 12 and the slave chip 14 are in a mobile terminal, activation of a cellular modem within the mobile terminal may cause the frequency to change such that the primary frequency on the interchip bus 16, as well as the harmonics of the frequency, does not overlap the cellular frequencies. Likewise, even though the interchip bus 16 is generally EMI tolerant, changing the frequencies on the interchip bus may allow the communication between the master chip 12 and the slave chip 14 to move to a less noisy frequency, so as to avoid being the victim of other EMI aggressors within the computing device 10.

The frequency changing ability is facilitated because the slave chip 14 wakes up or settles on the new frequency relatively quickly since there is no need to wake a slave PLL or allow a slave PLL to settle at a new frequency. The only latency is the waking of the master PLL (e.g., the PLL 24). Thus, once the PLL 24 has settled, packets may be sent across the interchip bus 16. Additionally, a wider variety of frequencies are available to reduce EMI concerns. For example, conventional PCIe operates at three frequencies (i.e., 8, 5, and 2.5 Gbps), but exemplary aspects of the present disclosure are not so limited. A further advantage of exemplary aspects of the present disclosure is how the master CDR circuit 54 and the slave CDR circuit 110 are managed. In conventional systems, a CDR circuit is run continuously to keep the frequency from drifting. Such continuous operation consumes power. As noted above, the PLL 24 may have a 0 ppm frequency offset. With such small sinusoidal jitter, continuous use of the master CDR circuit 54 and the slave CDR circuit 110 is not needed, and one or both of CDR circuits 54 and 110 may be put into low power or sleep modes for extended periods of time. The absence of a slave PLL in the slave chip 14 means that, with respect to the master chip 12, the slave chip 14 is source synchronous, which helps reduce the need for the slave CDR circuit 110 to run continuously.

It should be appreciated that even highly accurate PLLs such as the PLL 24 may drift as a function of temperature. Additional temperature-induced drift may be introduced by other elements of the chips 12 and 14, as well as on the interchip bus 16, or even in other locations within the computing device 10. Such temperature-induced drift may cause a need for re-alignment of the PLL 24. Exemplary aspects of the present disclosure use the timer/temperature logics 86 and 126 to address the need for re-alignment of the PLL 24. In a first exemplary aspect, the timer control logic 84 is used to wake the master CDR circuit 54 periodically to check for any realignment needs. Likewise, the timer control logic 124 is used to wake the slave CDR circuit 110 periodically to check for any realignment needs. The period for the master CDR circuit 54 may be different than or the same as the period for the slave CDR circuit 110. Further the period may be programmed as needed or desired. Still further, the length of time that the master CDR circuit 54 and the slave CDR circuit 110 are awake (after being woken by the timer control logics 84 and 124) may be programmed as needed or desired. In a non-mutually exclusive alternate aspect, the temperature control logics 82 and 122 may use the temperature sensors 80 and 80' to detect a temperature and store a temperature sensor value at an end of an initial alignment period. This temperature sensor value may be stored in memory associated with the MCS 18 or the SCS 32, respectively. Periodically, a current temperature sensor value may be compared to the stored value, and, if there is a temperature change above a predefined threshold, the master CDR circuit 54 and the slave CDR circuit 110 are activated and any needed re-alignment is performed. New temperature values from the temperature sensors 80 and 80' are collected and may be stored, potentially overwriting the previously stored value. The timer/temperature logics 86 and 126 may also communicate with other calibration systems.

The master chips 12 and the slave chips 14 may be assembled into different configurations depending on the needs of a particular computing device such as the computing device 10. The combination of the master chip 12 of FIG. 2 and the slave chip 14 of FIG. 3 may result in a full duplex system in that an equal number of data channels are provided to transmit from the master chip 12 to the slave chip 14 and to transmit from the slave chip 14 to the master chip 12. Other exemplary aspects of the present disclosure provide alternate configurations as explored in FIGS. 4-8.

Figure 4:
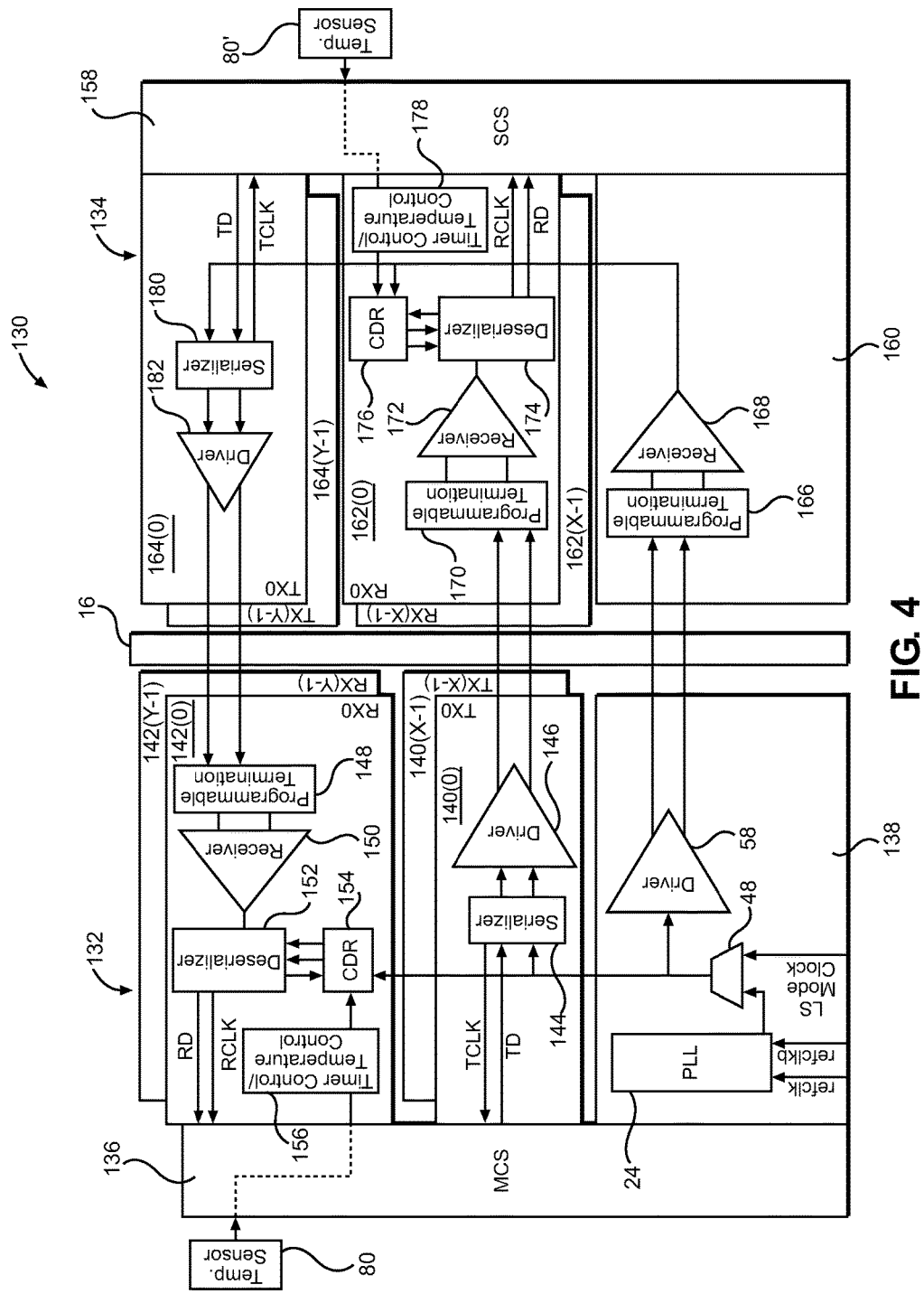
FIG. 4 is a simplified block diagram of a computing device with an exemplary asymmetric chip to chip communication link.

In this regard, FIG. 4 illustrates a simplified block diagram of a computing device 130 with an exemplary asymmetric chip to chip communication link. Common elements between FIGS. 2, 3, and 4 are shown therein with common element numbers and will not be redescribed herein. The computing device 130 includes a master chip 132 and a slave chip 134 commuincatively coupled by the interchip bus 16. The master chip 132 includes an MCS 136, a master clock module 138, a plurality of master transmitter modules 140(0)-140(X−1), and a plurality of master receiver modules 142(0)-142(Y−1). The master clock module 138 includes the PLL 24, the multiplexer 48, and the driver 58. The plurality of master transmitter modules 140(0)-140(X−1) are identical and each includes a respective master serializer 144 and master driver 146. The plurality of master transmitter modules 140(0)-140(X−1) are similar to the master transmitter 40 of FIG. 2, but without any of the clocking circuitry. The plurality of master receiver modules 142(0)-142(Y−1) are identical and each includes a master programmable termination 148, a master receiver logic 150, a master deserializer 152, a master CDR circuit 154, and a timer/temperature control 156. In another exemplary aspect (not illustrated), the plurality of master receiver modules 142(0)-142(Y−1) share a single one of the master CDR circuit 154 and a single one of the timer/temperature control 156. The plurality of master receiver modules 142(0)-142(Y−1) are similar to the master receiver 42. It should be appreciated that X does not have to equal Y, and thus, there may be an asymmetric number of transmit and receive channels for the master chip 132.

With continued reference to FIG. 4, the slave chip 134 has an SCS 158, a slave clock module 160, a plurality of slave receiver modules 162(0)-162(X−1), and a plurality of slave transmitter modules 164(0)-164(Y−1). The slave clock module 160 includes a programmable termination 166 and a receiver 168 similar to the slave clocking circuitry of FIG. 3. Each of the plurality of slave receiver modules 162(0)-162(X−1) includes a slave programmable termination 170, a slave receiver 172, a slave deserializer 174, a slave CDR circuit 176, and a timer/temperature control 178. In another exemplary aspect (not illustrated), the plurality of slave receiver modules 162(0)-162(X−1) share a single one of the slave CDR circuit 176 and a single one of the timer/temperature control 178. The plurality of slave receiver modules 162(0)-162(X−1) are similar to the slave receiver 92, but without the clock receiver logic 100 of the slave receiver 92 (since the slave clock module 160 is shared across the plurality of slave receiver modules 162(0)-162(X−1). Each of the plurality of slave transmitter modules 164(0)-164(Y−1) includes a serializer 180 and a driver 182. Each of the plurality of slave transmitter modules 164(0)-164(Y−1) is similar to the slave transmitter 90.

By constructing the computing device 130, transmission from the master chip 132 to the slave chip 134 may have a different bandwidth than transmission from the slave chip 134 to the master chip 132. Such an arrangement may be appropriate for an output element (e.g., a master to a display controller or a master to an audio speaker) where there is little communication from the output element to the master or for an input element (e.g., a microphone) where there is little communication from the master to the input element.

Figure 5:
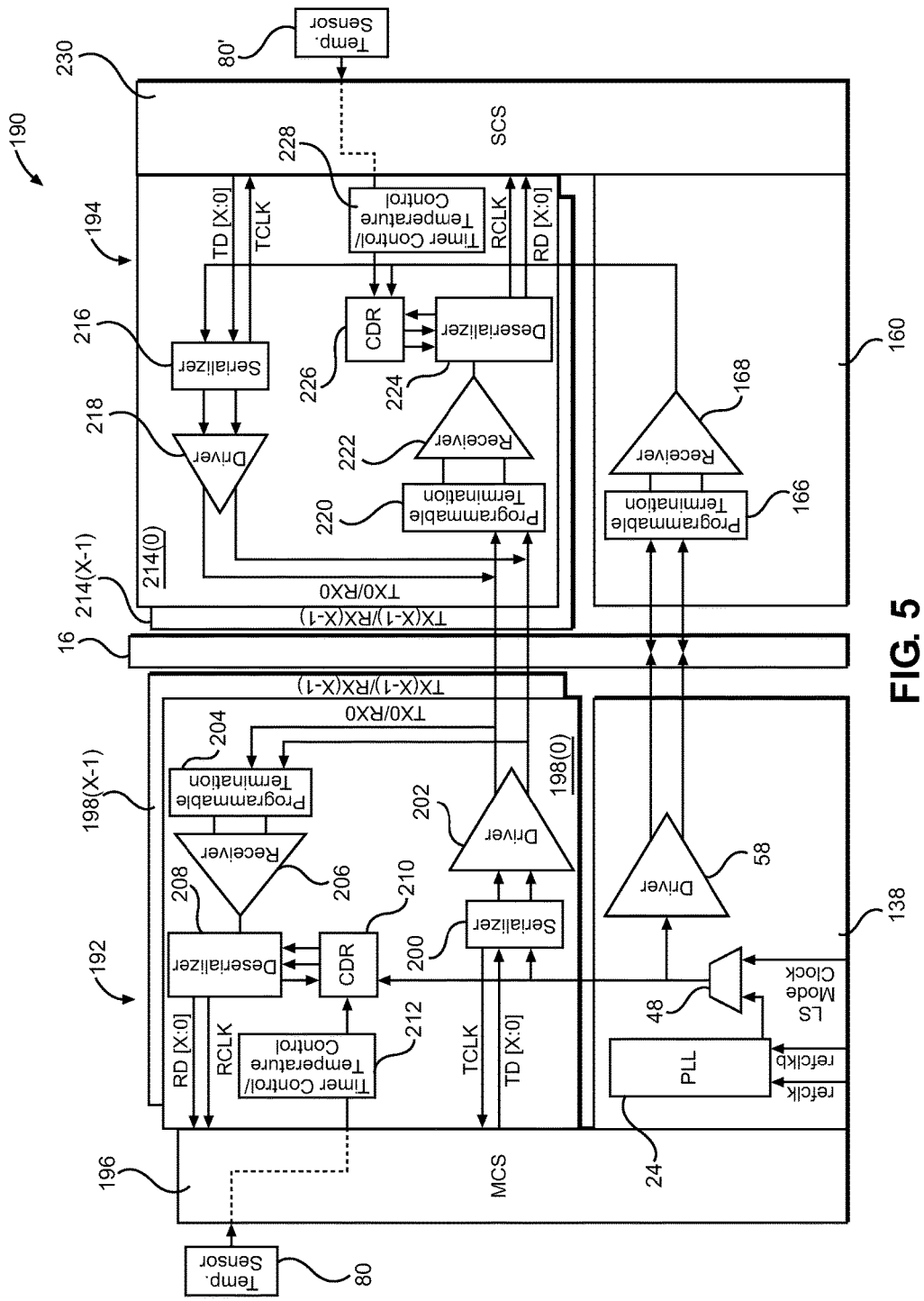
FIG. 5 is a simplified block diagram of a computing device with an exemplary asymmetric chip to chip communication link and selectable numbers of receiving or transmitting channels.

FIG. 5 is a simplified block diagram of a computing device 190 with an exemplary asymmetric chip to chip communication link and selectable numbers of receiving or transmitting channels. Common elements between FIGS. 4 and 5 are shown therein with common element numbers and will not be redescribed herein. The computing device 190 includes a master chip 192 and a slave chip 194 interconnected by the interchip bus 16. The master chip 192 includes an MCS 196, the master clock module 138 of FIG. 4, and a plurality of master transceiver modules 198(0)-198(X−1). Each of the plurality of master transceiver modules 198(0)-198(X−1) includes a master serializer 200, a master driver 202, a master programmable termination 204, a master receiver 206, a master deserializer 208, a master CDR circuit 210, and a timer/temperature control 212. In another non-illustrated aspect, a single one of the master CDR circuit 210 and a single one of the timer/temperature control 212 may be shared amongst all of the plurality of master transceiver modules 198(0)-198(X−1). The master driver 202 and the master programmable termination 204 couple to the interchip bus 16 through a common node (which may be a switch, not illustrated). The MCS 196 determines whether a particular transceiver module of the plurality of master transceiver modules 198(0)-198(X−1) will operate as a transmitter or a receiver.

With continued reference to FIG. 5, the slave chip 194 includes the slave clock module 160 of FIG. 4 and a plurality of slave transceiver modules 214(0)-214(X−1). Each of the plurality of slave transceiver modules 214(0)-214(X−1) includes a slave serializer 216, a slave driver 218, a slave programmable termination 220, a slave receiver 222, a slave deserializer 224, a slave CDR circuit 226, a timer/temperature control 228, and an SCS 230. In another non-illustrated aspect, a single one of the slave CDR circuit 226 and a single one of the timer/temperature control 228 may be shared amongst all of the plurality of slave transceiver modules 214(0)-214(X−1). The slave driver 218 and the slave programmable termination 220 couple to the interchip bus 16 through a common node (which may be a switch, not illustrated). The SCS 230 receives an indication from the MCS 196 as to which of the plurality of slave transceiver modules 214(0)-214(X−1) will act as transmitters or receivers and configures the plurality of slave transceiver modules 214(0)-214(X−1). The arrangement of the computing device 190 may be appropriate where one side is likely to send more data than the other side. Thus, the more active side transmits while the less active side receives. Note that this arrangement may dynamically change and lanes may be reassigned as needed or desired. Further, lanes may be time divided to allow balance if needed or desired.

Figure 6:
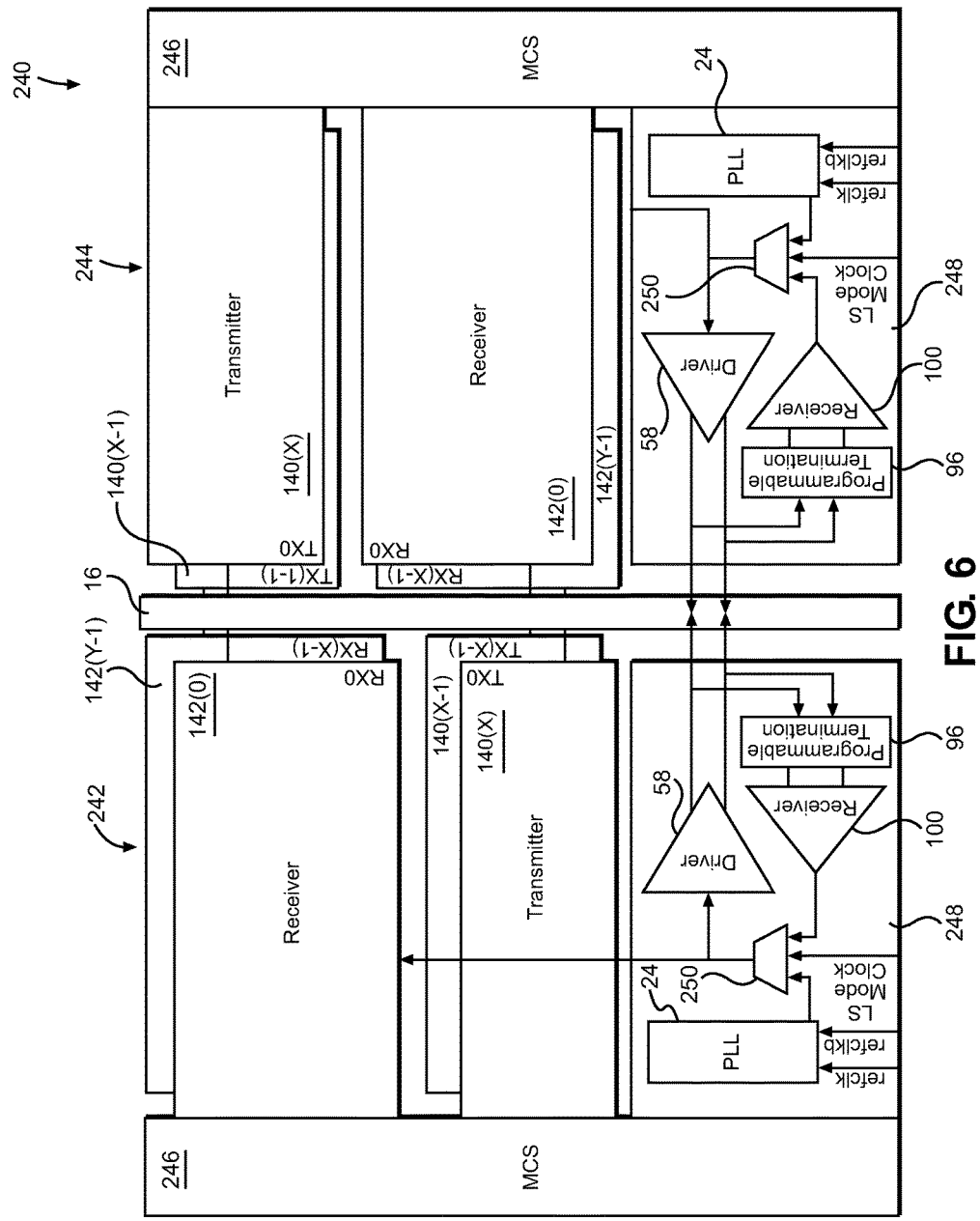
FIG. 6 is a simplified block diagram of a computing device with an exemplary asymmetric chip to chip communication link with a selectable master.

FIG. 6 is a simplified block diagram of a computing device 240 with an exemplary asymmetric chip to chip communication link with a selectable master. Common elements between FIGS. 4, 5, and 6 are shown therein with common element numbers and will not be redescribed herein. In this regard, the computing device 240 includes a first master chip 242 and a second master chip 244 communicatively coupled by an interchip bus 16. Each of the master chips 242 and 244 includes an MCS 246, the plurality of master transmitter modules 140(0)-140(X−1) of FIG. 4, the plurality of master receiver modules 142(0)-142(Y−1), and a master clock module 248. The master clock module includes the PLL 24, the driver 58, the clock programmable termination 96, the clock receiver logic 100, and a multiplexer 250. The driver 58 and the clock programmable termination 96 couple to the interchip bus 16 through a common node (which may be a switch, not illustrated). In contrast to the multiplexer 48 of FIG. 2, the multiplexer 250 selects between the high speed clock signal 46, the low speed clock signal 50, and a clock signal received from the other master chip 242 or 244.

The computing device 240 may be assembled when identical chips are purchased and installed during manufacture and one of the chips is designated as a master and the other chip is designated as a slave, even though both are capable of serving as a master chip. Such designation may be done through a jumper, setting a connection, grounding a pin, or the like. In another exemplary aspect, the master chips 242 and 244 negotiate which will be the master and which will be the slave. In a further exemplary aspect, the chips 242 and 244 may dynamically change which one is the master chip and which one is the slave chip. For example, an initial slave chip may determine that it needs to send data at a frequency different than what was used by the initial master chip. The initial slave chip may assume subsequent master chip status and send data to the subsequent slave chip using the different frequency. Once the master chip is selected, the PLL 24, the driver 58 and the clock receiver logic 100 of the selected slave chip are deactivated or put into a low power mode. The multiplexer 250 for the slave chip will use the clock signal received from the other master chip 242 or 244. While there is some area penalty for the duplicated circuitry, power savings may still be effectuated. Likewise, the fast frequency changes of other exemplary aspects are also preserved because there is no need to wait for the deactivated PLL to settle.

Figure 7:
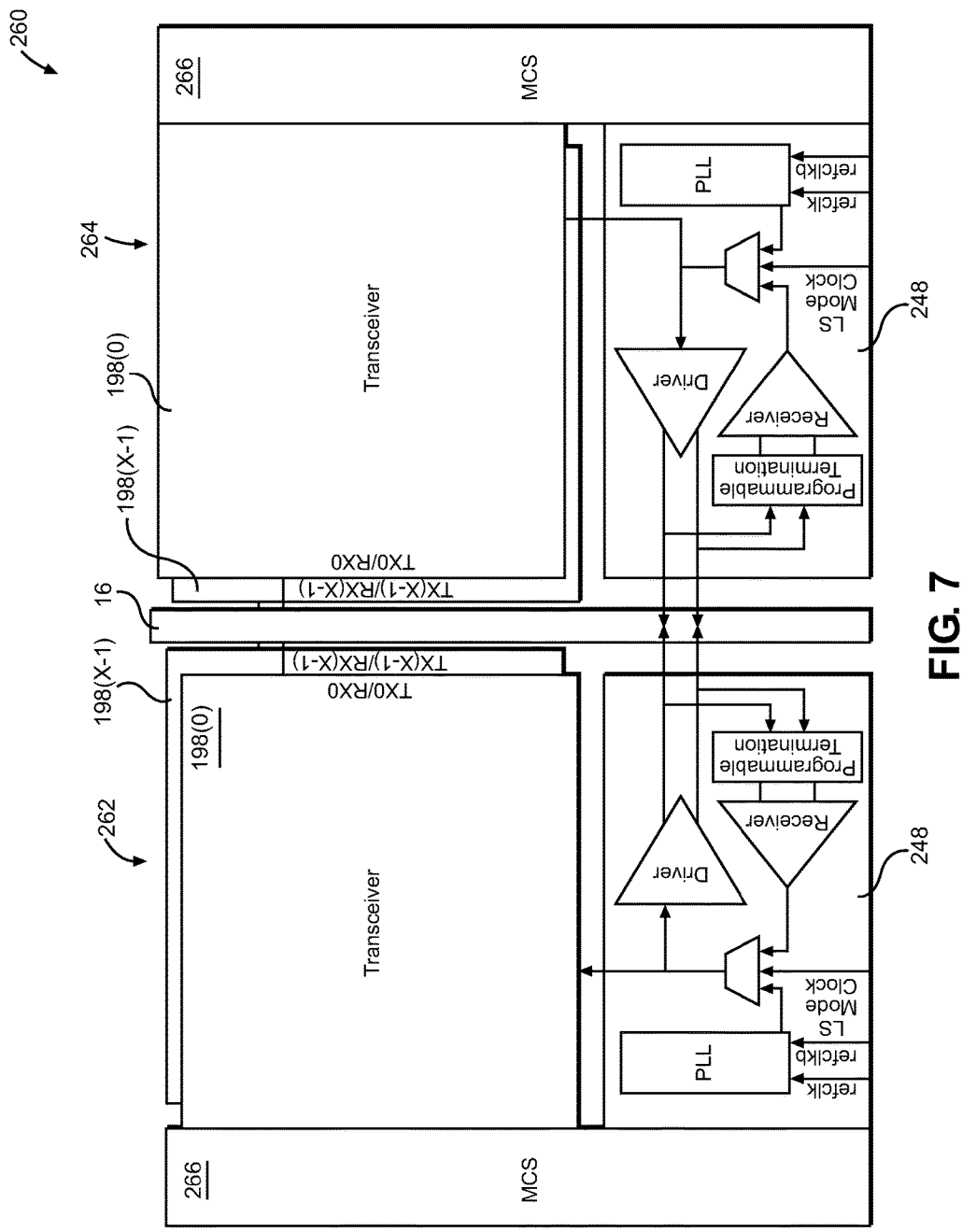
FIG. 7 is a simplified block diagram of a computing device with an exemplary asymmetric chip to chip communication link with a selectable master and selectable numbers of receiving or transmitting channels.

FIG. 7 is a simplified block diagram of a computing device 260 with an exemplary asymmetric chip to chip communication link with a selectable master and selectable numbers of receiving or transmitting channels. Common elements between FIGS. 4, 5, 6, and 7 are shown therein with common element numbers and will not be redescribed herein. Similar to the computing device 240 of FIG. 6, the computing device 260 includes two master chips 262 and 264 intercoupled by an interchip bus 16. Each of the master chips 262 and 264 includes an MCS 266, the plurality of master transceiver modules 198(0)-198(X−1) of FIG. 5, and the master clock module 248. As with the computing device 240, one of the master chips 262 and 264 is designated as a slave chip and one is designated as a master chip. Once the master chip is selected, the PLL 24, the driver 58 and the clock receiver logic 100 of the selected slave chip are deactivated or put into a low power mode. The multiplexer 250 for the slave chip will use the clock signal received from the other master chip 262 or 264. While there is some area penalty for the duplicated circuitry, power savings may still be effectuated. Likewise, the fast frequency changes of other exemplary aspects are also preserved because there is no need to wait for the deactivated PLL to settle. Further, there may be a pin savings, because each of the plurality of master transceiver modules 198(0)-198(X−1) has only two pins compared to the four pins of the transmitter/receiver pair in computing device 190. Unused lanes may be turned on and off as needed to conserve power.

As a further benefit from moving away from the conventional chip to chip communication standards such as PCIe, Universal Serial Bus (USB), or digRF, exemplary aspects of the present disclosure allow non-standard voltage levels to be used for the signals on the interchip bus 16. That is, with appropriate programming of the programmable terminations 68, 96, 98, 148, 166, 170, 204, and 220, relatively low voltage signals may be sent. Such low voltage signals further reduce the likelihood that the interchip bus 16 is an EMI aggressor and provide further power savings relative to existing communication standards.

While the power savings and EMI improvement afforded by exemplary aspects of the present disclosure are substantial, they come at the cost of making a chip that can communicate only with other chips that are similarly designed. Thus, chips designed to work with PCIe, USB, digRF, or the like will not be able to communicate with the master chip 12, 132, 192, 242, or 262 or the slave chip 14, 134, 194, 244, or 264 since the frequency hopping functionality would not be present or the voltage levels would be too low for a standards-based chip to detect and evaluate correctly. However, another exemplary aspect of the present disclosure provides a dual-mode backwards compatible chip that shares pins (or bumps) of a bus interface so that in a first mode the chip uses standards-based circuitry and in a second mode, the chip uses circuitry based on the present disclosure.

Figure 8:
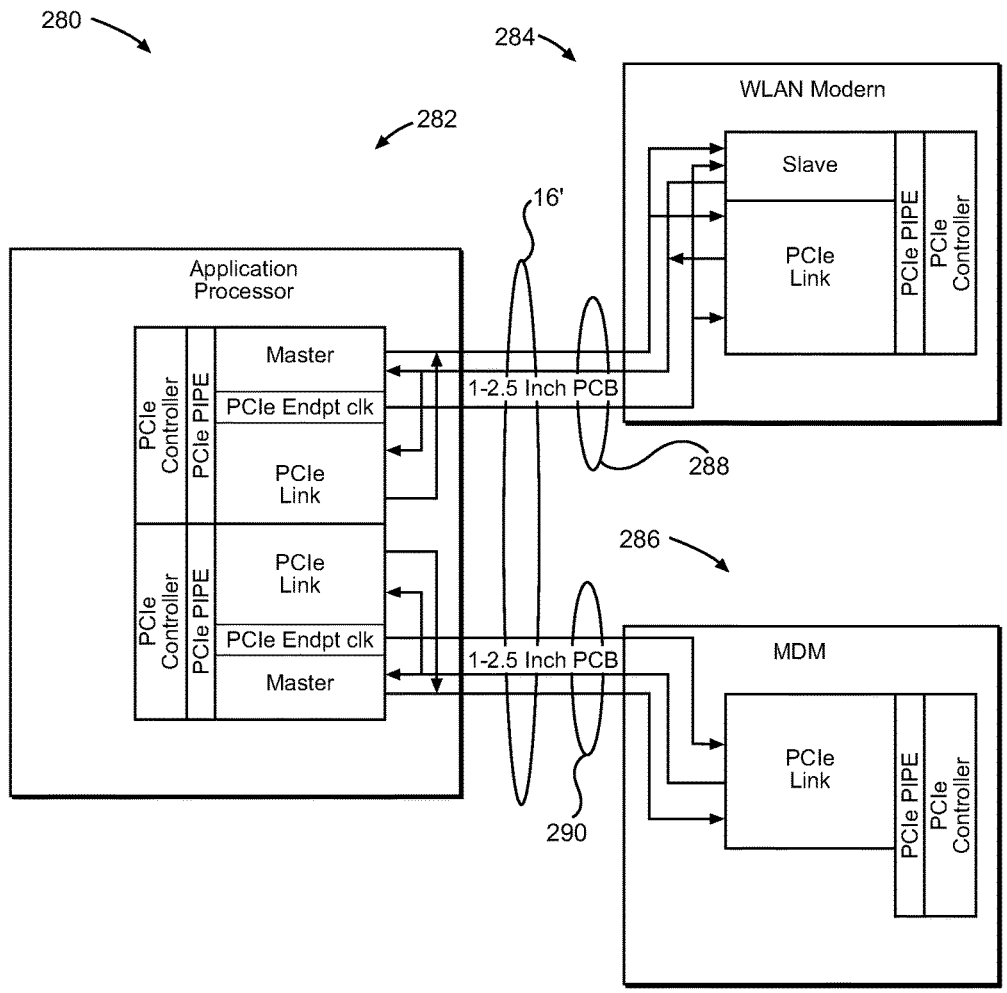
FIG. 8 is a block diagram of an exemplary chip with shared bumps for use with standard conforming chips and non-standard conforming chips.

In this regard, FIG. 8 is a block diagram of an exemplary computing device 280 with a mix of new and legacy chips to illustrate the backward compatibility of the present disclosure. In particular, an application processor 282 may be a master chip capable of using exemplary aspects of the present disclosure as well as being capable of using PCIe. The application processor 282 is coupled to a wireless local area network (WLAN) modem 284 and a modem device modem (MDM) 286. The WLAN modem 284 includes circuitry according to exemplary aspects of the present disclosure, and the MDM 286 operates strictly according to PCIe. The application processor 282 and the WLAN modem 284 place the bus interface of the present disclosure in parallel with the bus interface of the legacy standard such that any application processor, such as the application processor 282, may communicate with any other chip using the improved circuitry and methods of the present disclosure or whatever legacy protocol is used by the other chip. As illustrated, the interchip bus 16' includes a first portion 288 that carries signals according to exemplary aspects of the present disclosure and a second portion 290 that operates strictly according to PCIe. While this aspect of the present disclosure does impose an area penalty, the increase in flexibility of the application processor 282 and the WLAN modem 284 may be acceptable.

Figure 9:
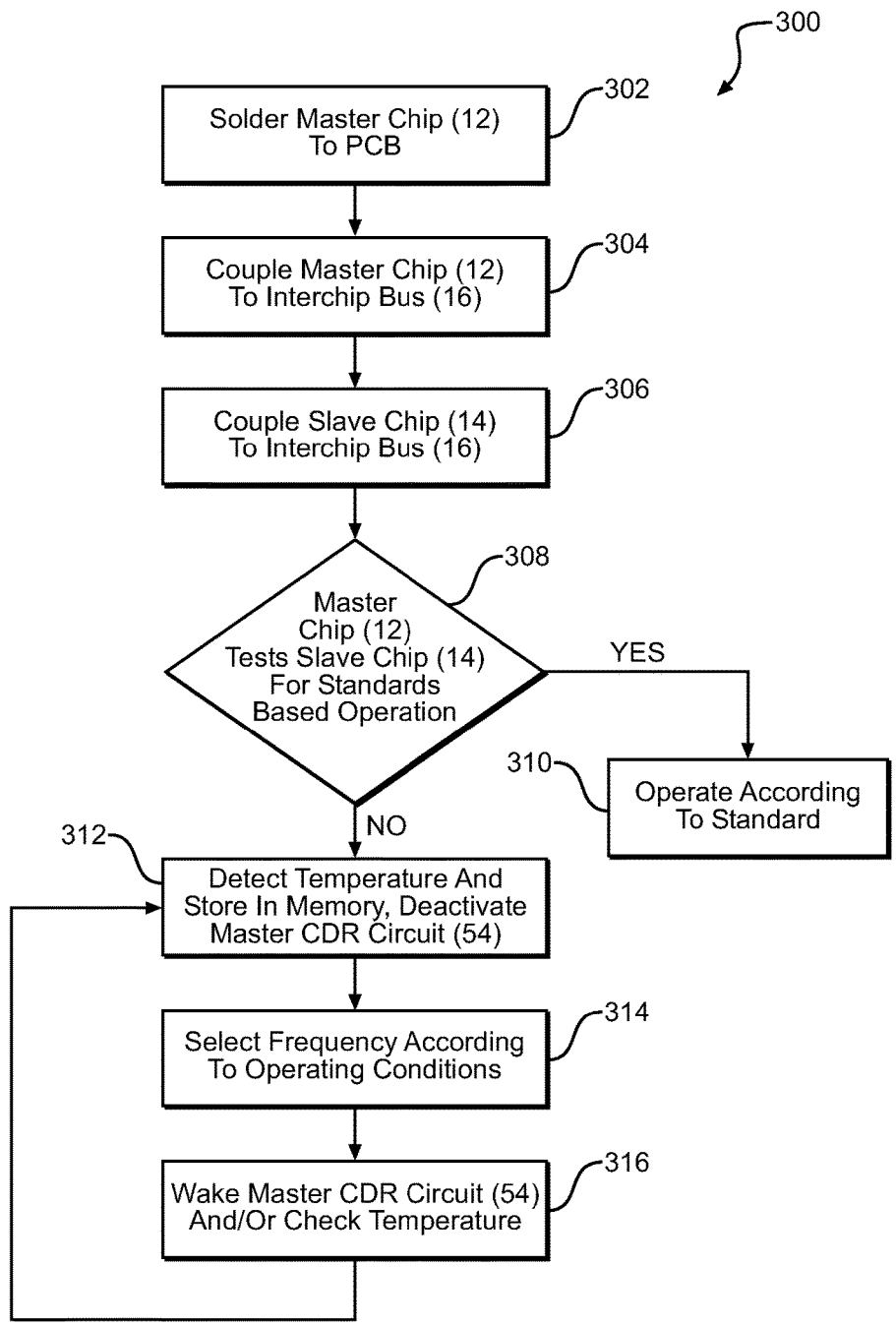
FIG. 9 is a flowchart illustrating an exemplary process for frequency shifting, power shifting, and sleep mode suitable for use with master and slave chips described herein.

FIG. 9 is a flowchart illustrating an exemplary process 300 for frequency shifting, power shifting, and sleep mode suitable for use with master and slave chips described herein. The process 300 begins with the installation of the master chip 12 (or other master chip) onto a printed circuit board (PCB). In an exemplary aspect, the master chip 12 is soldered to the PCB (block 302). The master chip 12 is coupled to the interchip bus 16 (block 304). This coupling may be done at the same time as the installation. For example, soldering the master chip 12 to the PCB may be done concurrently with soldering the master chip 12 to the interchip bus 16. One or more slave chips such as the slave chip 14 are coupled to the interchip bus 16 (block 306). Coupling the slave chip 14 to the interchip bus 16 may involve soldering or similar connection activities. The master chip 12 may test the slave chip 14 for standards-based operation (block 308). For example, the master chip 12 may send a PCIe compliant device and see if a response is received. Alternatively, the master chip 12 may be programmed to recognize what sort of the slave chip 14 to which it is communicatively coupled. In still another aspect, a jumper, fuse, or similar toggle or switch may be used to indicate the mode of operation to the master chip 12. If the master chip 12 detects that the slave chip 14 is a standards-based chip, the process 300 allows the master chip 12 to operate according to the standard (block 310).

With continued reference to FIG. 9, process 300 continues in that if the master chip 12 detects that the slave chip 14 is not a standards-based chip, the master chip 12 may use the temperature sensor 80 to detect a temperature and store the information in memory. After the master PLL 24 settles, the master CDR circuit 54 may be deactivated (block 312). The master chip 12 begins normal operation by sending and receiving signals to and from the one or more slave chips 14. At different times the MCS 18 may detect that operating conditions have changed. Such detection may be in the form of sensors detecting the changed condition or an instruction from a central controller that controls an entire computing device. For example, the central controller may instruct the MCS 18 that a cellular modem is being activated. The MCS 18 then selects a frequency appropriate to the operating conditions (block 314). Continuing the cellular modem example, a frequency spaced from the cellular frequencies is selected. When the frequency changes, the MCS 18 may instruct the programmable terminations 68, 96, and 98 to change impedances to match impedances for the new frequencies. Operation continues with the frequency changing as operating conditions change.

With continued reference to FIG. 9, the master CDR circuit 54 is woken (either periodically or based on a temperature change) and an appropriate offset is created according to a new temperature (block 316). The process 300 continues at block 312.

The systems and methods for chip to chip communication according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a smart phone, a tablet, a computer, a portable computer, a desktop computer, a personal digital assistant (PDA), a monitor, a computer monitor, a television, a tuner, a radio, a satellite radio, a music player, a digital music player, a portable music player, a digital video player, an automobile, a video player, a digital video disc (DVD) player, and a portable digital video player.

Figure 10:
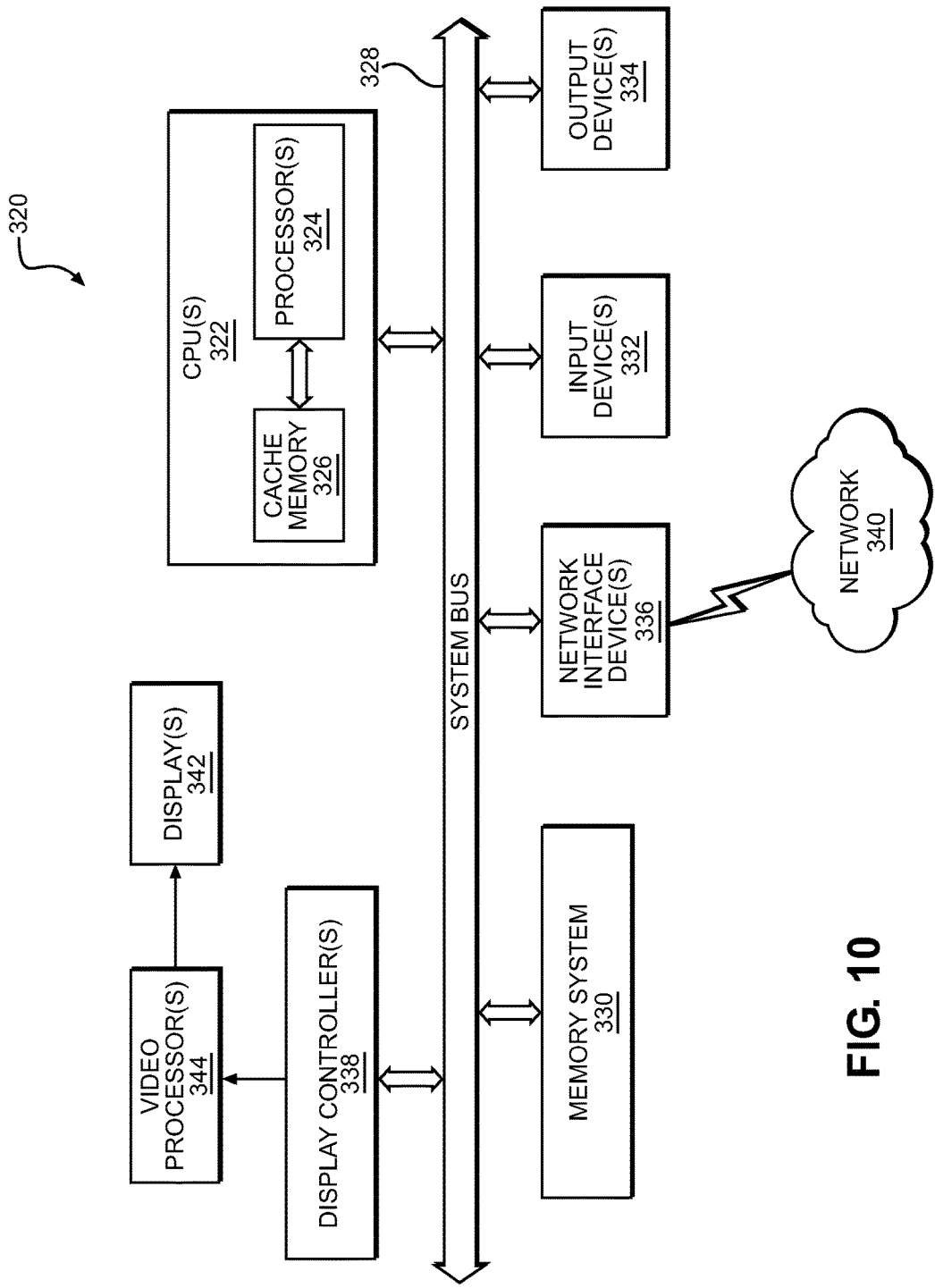
FIG. 10 is a block diagram of an exemplary processor-based system that can include the master or slave chips using the chip to chip communication scheme described herein.

In this regard, FIG. 10 illustrates an example of a processor-based system 320 that can employ the master chips 12, 132, 192, 242, and 262 and the slave chips 14, 134, 194, 244, and 264 illustrated in FIGS. 1-8. In this example, the processor-based system 320 includes one or more central processing units (CPUs) 322, each including one or more processors 324. The CPU(s) 322 may be the master chip 12. The CPU(s) 322 may have cache memory 326 coupled to the processor(s) 324 for rapid access to temporarily stored data.

The CPU(s) 322 is coupled to a system bus 328 and can intercouple master and slave devices included in the processor-based system 320. The system bus 328 may be the interchip bus 16 illustrated in FIG. 1. As is well known, the CPU(s) 322 communicates with these other devices by exchanging address, control, and data information over the system bus 328. For example, the CPU(s) 322 can communicate bus transaction requests to a memory system 330 as an example of a slave device.

Other master and slave devices can be connected to the system bus 328. As illustrated in FIG. 10, these devices can include the memory system 330, one or more input devices 332, one or more output devices 334, one or more network interface devices 336, and one or more display controllers 338, as examples. The input device(s) 332 can include any type of input device, including, but not limited to, input keys, switches, voice processors, etc. The output device(s) 334 can include any type of output device, including, but not limited to, audio, video, other visual indicators, etc. The network interface device(s) 336 can be any devices configured to allow exchange of data to and from a network 340. The network 340 can be any type of network, including, but not limited to, a wired or wireless network, a private or public network, a local area network (LAN), a WLAN, and the Internet. The network interface device(s) 336 can be configured to support any type of communications protocol desired.

The CPU(s) 322 may also be configured to access the display controller(s) 338 over the system bus 328 to control information sent to one or more displays 342. The display controller(s) 338 sends information to the display(s) 342 to be displayed by one or more video processors 344, which process the information to be displayed into a format suitable for the display(s) 342. The display(s) 342 can include any type of display, including, but not limited to, a cathode ray tube (CRT), a liquid crystal display (LCD), a light emitting diode (LED) display, a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The devices described herein may be employed in any circuit, hardware component, IC, or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A master integrated circuit (IC) comprising:
   a bus interface configured to be coupled to an interchip bus;
   a transmitter comprising a driver, the driver outputting a data signal to the bus interface for transmission across the interchip bus;
   a receiver coupled to the bus interface;
   a clock data recovery (CDR) circuit operatively coupled to the receiver;
   a phase locked loop (PLL) receiving a reference clock signal and outputting a clock signal to the driver of the transmitter and the CDR circuit, wherein the transmitter outputs a master clock signal onto the interchip bus through the bus interface;
a control system operatively coupled to the PLL and the CDR circuit, the control system configured to change a frequency of the master clock signal by controlling the PLL, wherein data transmission continues during frequency change independent of clock activity at a remote slave IC; and
a temperature control circuit operatively coupled to the control system and the CDR circuit, wherein the control system wakes the CDR circuit based on changes in temperature and the temperature control circuit.

2. The master IC of claim 1, further comprising a timer control circuit operatively coupled to the control system and the CDR circuit, wherein the control system periodically wakes the CDR circuit for a predetermined amount of time based on the timer control circuit to correct for clock drift.

3. The master IC of claim 1, wherein the temperature control circuit is configured to receive a temperature signal from a temperature sensor.

4. The master IC of claim 1, wherein the receiver comprises a programmable termination circuit configured to allow variation in a termination impedance associated with the receiver, and wherein the control system configures the termination impedance based on a distance to the remote slave IC.

5. The master IC of claim 1, further comprising a timer control circuit, wherein the control system is configured to wake the CDR circuit for an amount of time based on the timer control circuit in response to a signal from the temperature control circuit.

6. The master IC of claim 1, wherein the transmitter further comprises a serializer configured to receive the clock signal from the PLL.

7. The master IC of claim 1, further comprising a multiplexer coupled to the PLL and configured to receive a low speed clock signal and selectively pass either the clock signal or the low speed clock signal to the transmitter and the CDR circuit.

8. A slave integrated circuit (IC) comprising:
a bus interface configured to be coupled to an interchip bus;
a transmitter comprising a driver, the driver outputting a data signal to the bus interface for transmission across the interchip bus;
a receiver coupled to the bus interface, the receiver configured to extract a clock signal from a signal received from a master IC through the interchip bus;
a clock data recovery (CDR) circuit operatively coupled to the receiver;
a control system operatively coupled to the receiver and the CDR circuit, the control system configured to operate on the clock signal extracted by the receiver without reference to an internal phase locked loop (PLL) or internal clock; and
a temperature control circuit operatively coupled to the control system and the CDR circuit, wherein the control system wakes the CDR circuit based on changes in temperature and the temperature control circuit.

9. The slave IC of claim 8, further comprising a timer control circuit operatively coupled to the control system and the CDR circuit, wherein the control system periodically wakes the CDR circuit for a predetermined amount of time based on the timer control circuit to correct for clock drift.

10. The slave IC of claim 8, wherein the temperature control circuit is configured to receive a temperature signal from a temperature sensor.

11. The slave IC of claim 8, wherein the receiver comprises a programmable termination circuit configured to allow variation in a termination impedance associated with the receiver, and wherein the control system configures the termination impedance based on a distance to the master IC.

12. The slave IC of claim 8, further comprising a timer control circuit, wherein the control system is configured to wake the CDR circuit for an amount of time based on the timer control circuit in response to a signal from the temperature control circuit.

13. The slave IC of claim 8, wherein the transmitter further comprises a serializer.

14. The slave IC of claim 8, wherein the receiver further comprises a deserializer configured to pass a received slave clock signal to the control system.

15. A system comprising:
an interchip bus;
a first integrated circuit (IC) comprising:
a first bus interface configured to be coupled to the interchip bus;
a first transmitter comprising a first driver, the first driver outputting a first data signal to the first bus interface for transmission across the interchip bus;
a first receiver coupled to the first bus interface;
a first clock data recovery (CDR) circuit operatively coupled to the first receiver;
a first control system operatively coupled to the first CDR circuit; and
a temperature control circuit operatively coupled to the first control system and the first CDR circuit, wherein the control system wakes the first CDR circuit based on changes in temperature and the temperature control circuit; and
a second IC comprising:
a second bus interface configured to be coupled to the interchip bus;
a second transmitter comprising a second driver, the second driver outputting a second data signal to the second bus interface for transmission across the interchip bus;
a second receiver coupled to the second bus interface, the second receiver configured to extract a clock signal from a signal received from the first IC through the interchip bus;
a second CDR circuit operatively coupled to the second receiver; and
a second control system operatively coupled to the second receiver and the second CDR circuit, the second control system configured to operate on the clock signal extracted by the second receiver without reference to an internal phase locked loop (PLL) or internal clock; and
a sole active PLL shared between the first IC and the second IC, the sole active PLL configured to provide the clock signal for use by both the first IC and the second IC.

16. The system of claim 15 wherein the first control system and the second control system are configured to negotiate which of the first control system and the second control system will be a master control system and which of the first control system and the second control system will be a slave control system.

17. The system of claim 16, further comprising an inactive PLL associated with the slave control system, wherein the inactive PLL is configured to remain inactive after the negotiation of which of the first control system and the second control system will be the master control system.

18. The system of claim 16, wherein the master control system is configured to change frequencies on the interchip bus to reduce electromagnetic interference (EMI).

19. The system of claim 16, wherein the master control system is configured to change a programmable termination of the first receiver based on a distance between the first IC and the second IC.

* * * * *